(12) United States Patent
Huang

(10) Patent No.: US 7,118,315 B2
(45) Date of Patent: Oct. 10, 2006

(54) SPIKE NAIL STRUCTURE

(75) Inventor: Pan-Ching Huang, Changhua (TW)

(73) Assignee: Joker Industrial Co., Ltd., Changhua (TW)

( * ) Notice: Subject to any disclaimer, the term of this patent is extended or adjusted under 35 U.S.C. 154(b) by 0 days.

(21) Appl. No.: 11/039,796

(22) Filed: Jan. 24, 2005

(65) Prior Publication Data

US 2006/0165504 A1    Jul. 27, 2006

(51) Int. Cl.
*F16B 13/13* (2006.01)

(52) U.S. Cl. .................................. 411/30; 411/80.1
(58) Field of Classification Search ............. 411/55, 411/30, 31, 80.1, 60.1, 177–180, 477–480
See application file for complete search history.

(56) References Cited

U.S. PATENT DOCUMENTS

| | | | | |
|---|---|---|---|---|
| 2,601,803 A | * | 7/1952 | Newman | 411/80.1 |
| 3,148,579 A | * | 9/1964 | Giovanetti | 411/61 |
| 3,550,499 A | * | 12/1970 | Eilenberger | 411/61 |
| 4,500,238 A | * | 2/1985 | Vassiliou | 411/30 |
| 4,874,277 A | * | 10/1989 | Nowak et al. | 411/61 |
| 5,224,805 A | * | 7/1993 | Moretti et al. | 411/30 |
| 5,443,343 A | * | 8/1995 | Mutz et al. | 411/30 |
| 5,447,005 A | * | 9/1995 | Giannuzzi | 52/698 |
| 6,659,700 B1 | * | 12/2003 | Farrell et al. | 411/450 |

* cited by examiner

*Primary Examiner*—Flemming Saether
(74) *Attorney, Agent, or Firm*—Troxell Law Office PLLC

(57) ABSTRACT

A spike nail for nailing in walls made of gypsum boards or fiber boards has a nail body which consists of a first blade and a second blade. The nail body includes a striking section, a upper guiding sleeve, a lower guiding sleeve, a screw thread guiding section and a nail point section. The spike nail thus constructed can be nailed into gypsum board or fiber board walls to facilitate hanging articles.

4 Claims, 7 Drawing Sheets

SPIKE NAIL STRUCTURE

BACKGROUND OF THE INVENTION

1. Field of the Invention

The invention relates to a spike nail structure and particularly to a spike nail for nailing in walls made of gypsum boards or fiber boards to hang articles.

2. Description of the Prior Art

A conventional spike nail 1 (referring to FIG. 1) for nailing in walls made of gypsum boards or fiber boards such as the one disclosed in French patent No. 012420 includes a first blade 11 and a second blade 12 folding together. It has a striking section 13 to receive hitting of a tool to drive a nail point section 14 into a gypsum board or fiber board wall. Then a lag spike may be inserted to drive the first and the second blades apart to anchor the spike nail on the wall W. The lag spike can be used to hang articles. Such a structure still has drawbacks in use, notably:

1. The nail point section 14 of the spike nail 1 is formed by coupling a first nail point 111 of the first blade 11 and a second nail point 121 of the second blade 12. The first nail point 111 is longer than the second nail point 121. When the spike nail 1 is hit by a tool, the first nail point 111 pierces into wall W first. When the second nail point 121 pierces into the wall W, the cross sections of the first blade 11 and the second blade 12 increase the instantaneous resistance of piercing. The spike nail 1 tends to be deformed or split due to not sufficient strength. As a result, construction quality suffers. The wall W could even cracks.
2. The longitudinal distance between the nail point section 14 of the spike nail 1 and the striking section 13 is relatively long. In the event that either the first blade 11 or the second blade 12 is tilted slightly, the lag spike is skewed during fastening due to lack of guiding support.

SUMMARY OF THE INVENTION

In view of the aforesaid disadvantages, the present invention aims to provide a spike nail structure that consists of a first blade and a second blade coupling together to form a nail body. The nail body includes a striking section, a upper guiding sleeve, a lower guiding sleeve, a screw thread guiding section and a nail point section. The spike nail thus constructed can be nailed in walls made of gypsum boards or fiber boards to facilitate hanging articles.

In one aspect of the invention, the upper guiding sleeve and the lower guiding sleeve are maintained on a same center line.

In another aspect of the invention, the second blade has a second point section slightly smaller than a first point section of the first blade so that the second point section is held closely in an indented recess formed on the first point section to shrink the piercing cross section.

In yet another aspect of the invention, the first point section of the first blade has two sides formed respectively a saw-toothed edge.

In still another aspect, the first point section and the second point section of the first and the second blades have respectively a longitudinal reinforced rib corresponding to each other.

In another aspect of the invention, a transverse rib action zone that has at least one transverse and bent rib is formed on the first and the second blades between the nail point section and the lower guiding sleeve. The pitch between two transverse ribs corresponds to the pitch of the lag spike so that when the lag spike pierces into the spike nail the nail point section is driven and expanded at a greater amount.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
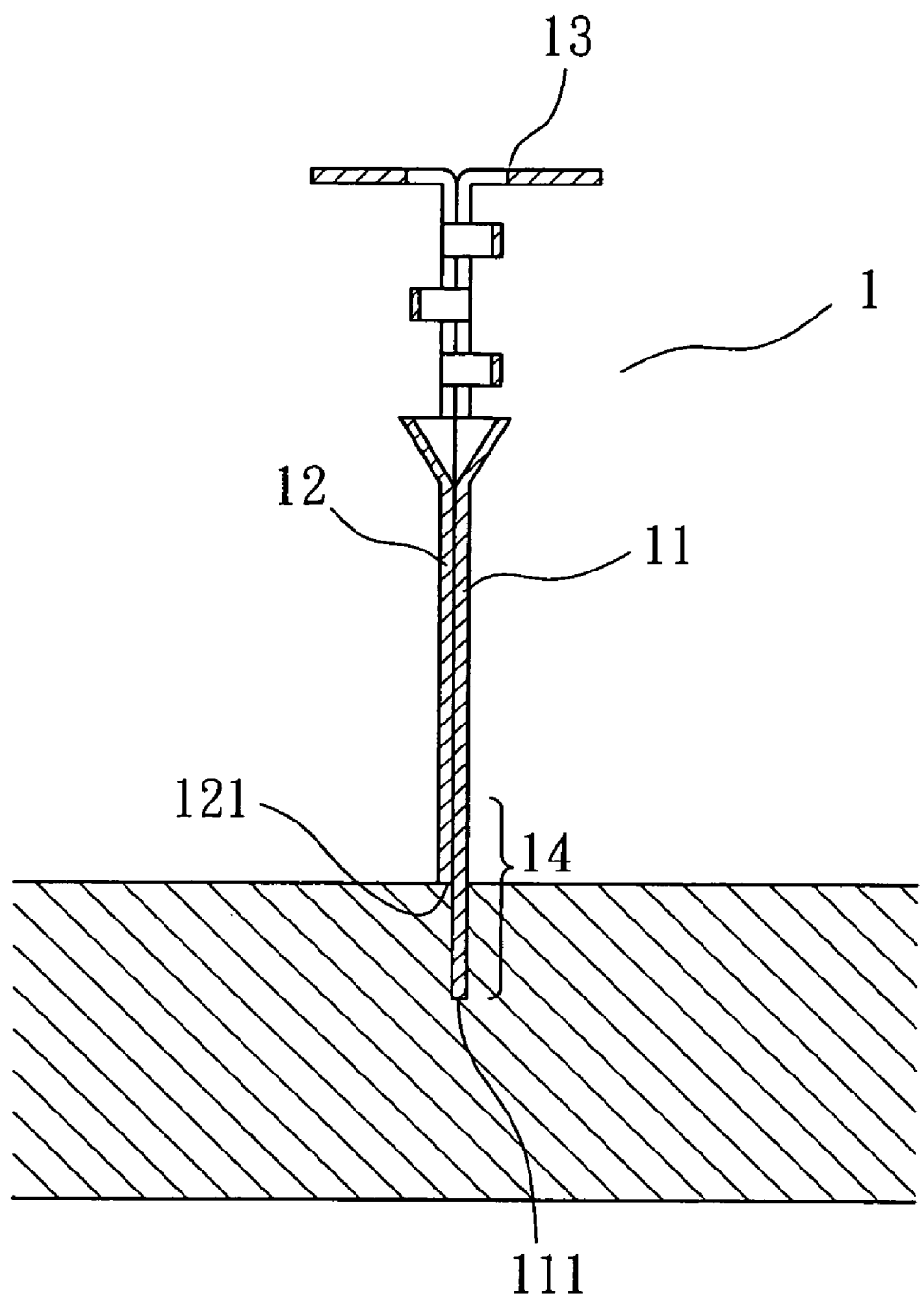
FIG. 1 is a sectional view of a conventional spike nail piercing through a wall.
Figure 2:
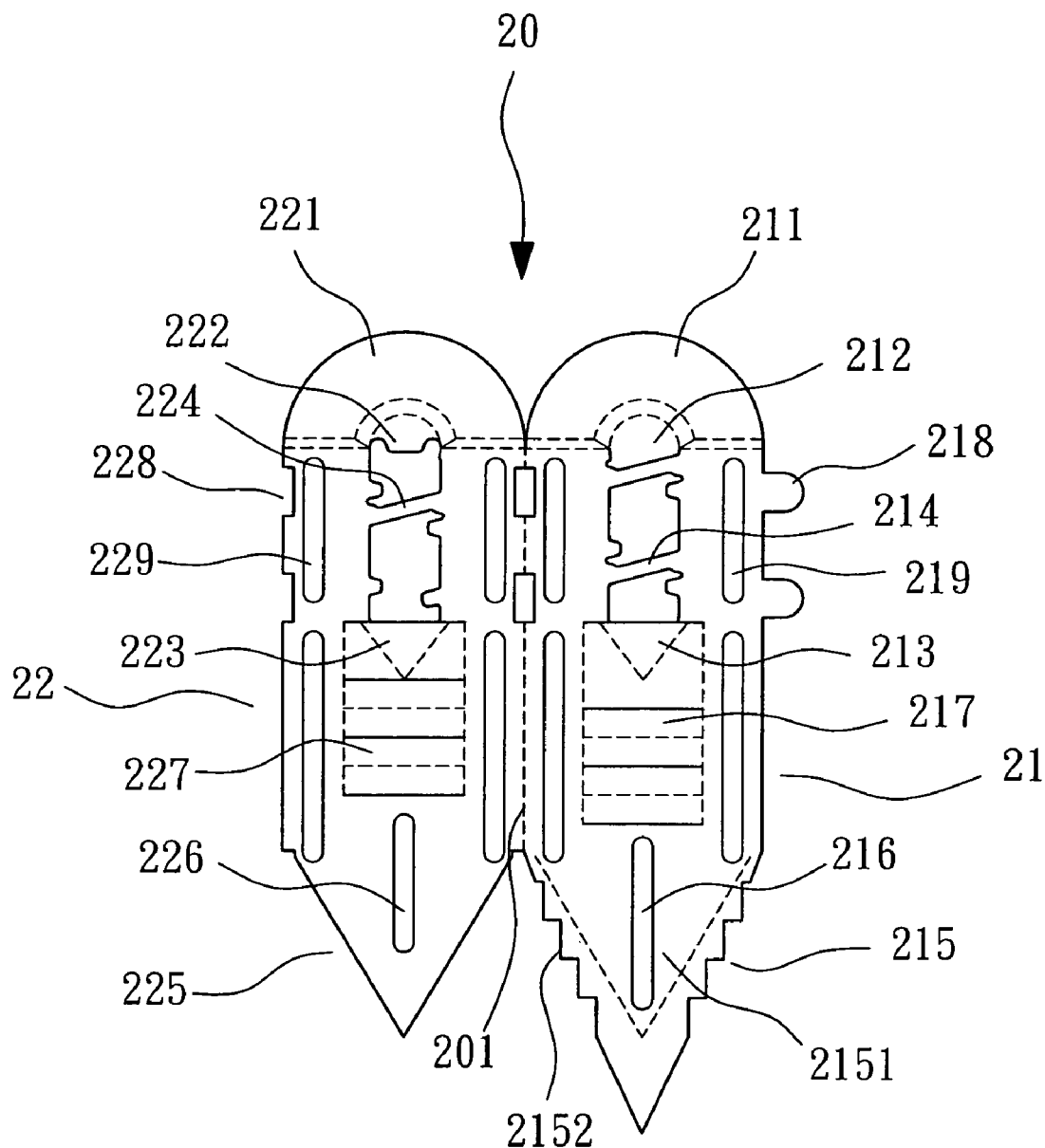
FIG. 2 is a schematic view of the spike nail of the invention in a unfolded condition.
Figures 3, 4:
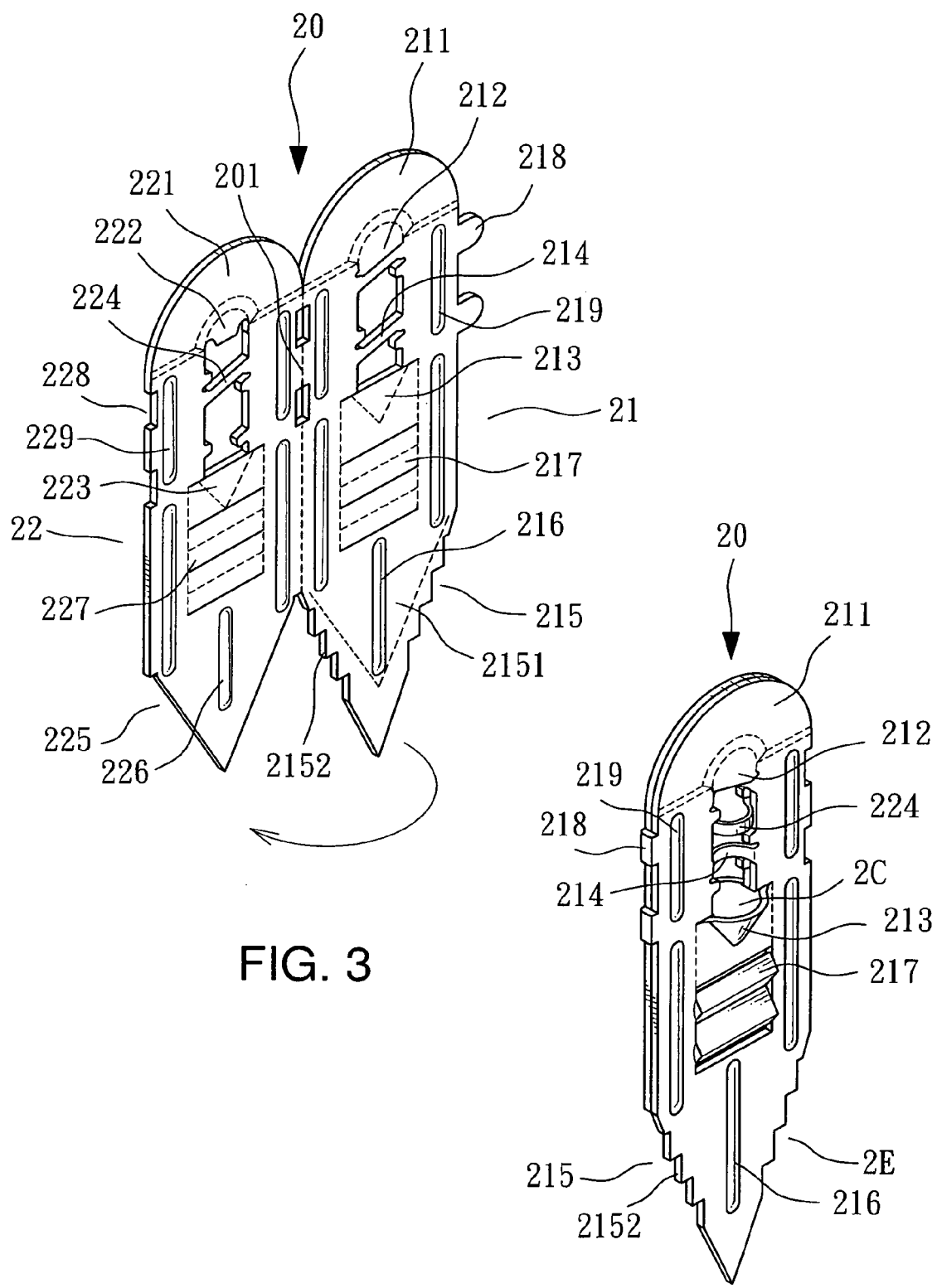
FIG. 3 is a perspective view of the spike nail of the invention in a unfolded condition.
FIG. 4 is a perspective view of the spike nail of the invention in a folded condition.
Figure 5:
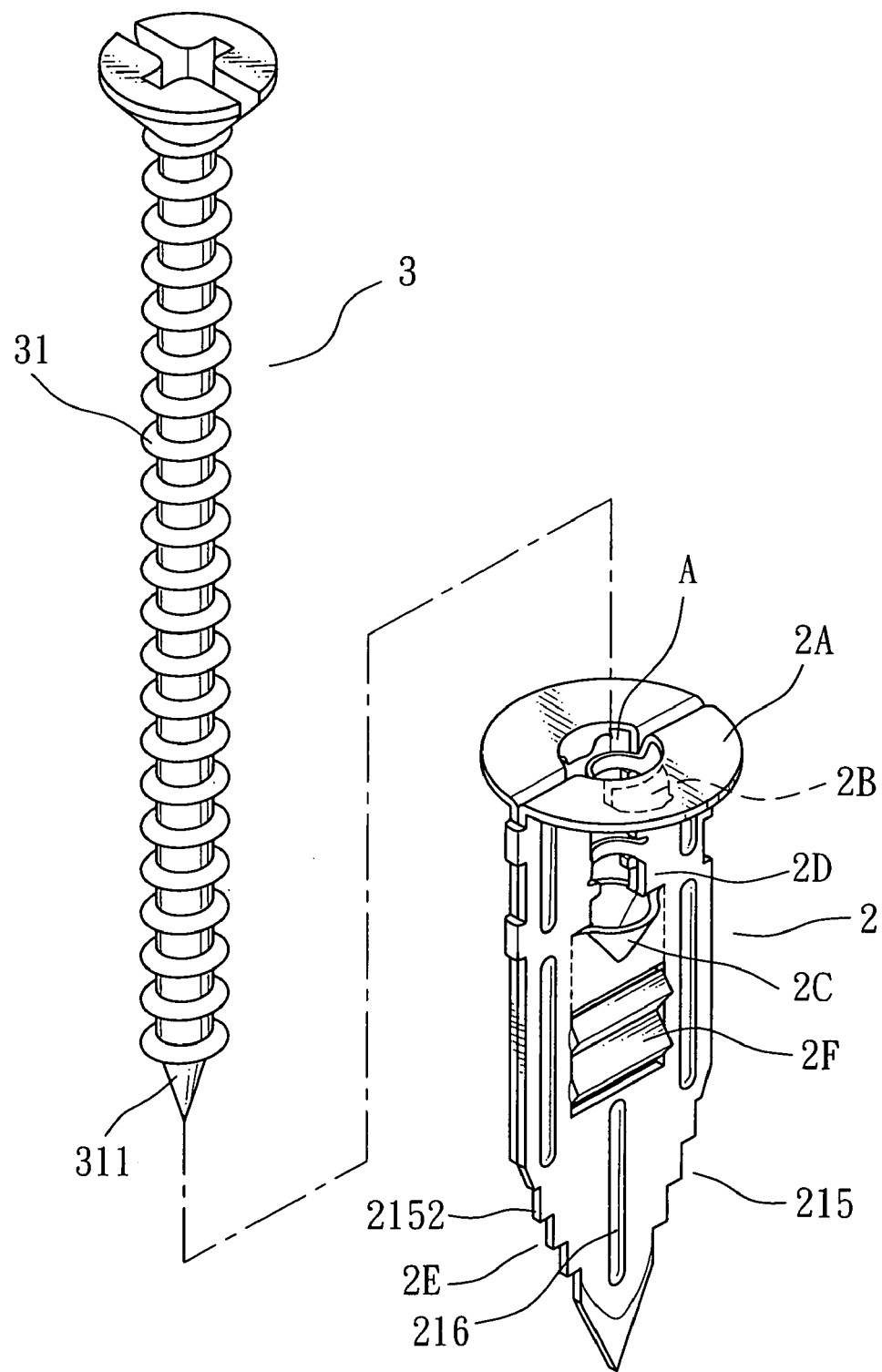
FIG. 5 is an exploded view of the invention.
Figure 6:
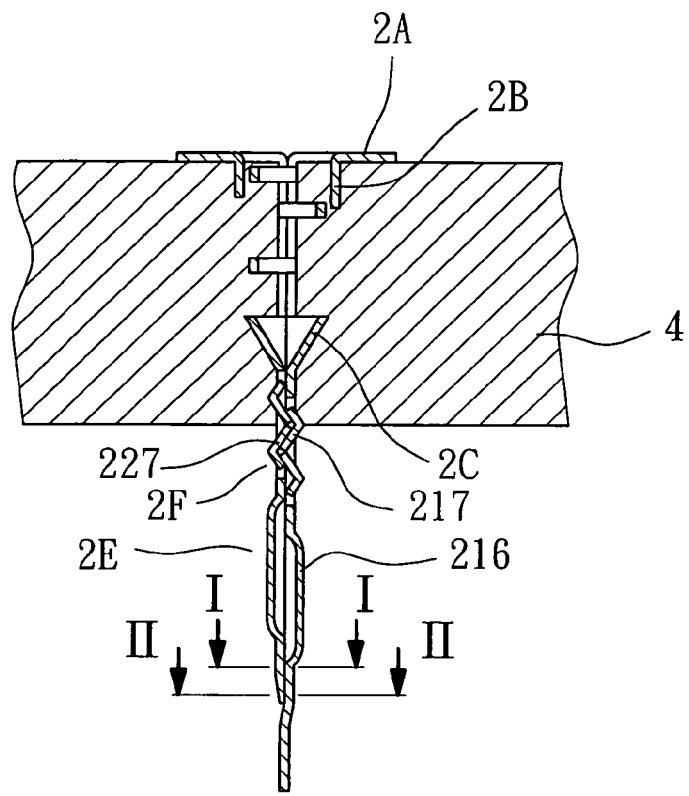
FIG. 6 is a schematic view of the invention nailed into a wall.

Referring to FIGS. 2 through 5, the spike nail 2 according to the invention includes a nail body 20 which consists of a first blade 21 and a second blade 22 folded and coupled together about a folding line 201. The nail body 20 includes:

a striking section 2A located on a upper side of the nail body 20 and formed by bending head sections 211 and 221 outwards that are located respectively on a upper portion of the first blade 21 and the second blade 22. It has a lag spike guiding hole A in the center;

a upper guiding sleeve 2B formed by extending hole walls 212 and 222 of the lag spike guiding hole A downwards to direct insertion of a lag spike 3;

a lower guiding sleeve 2C formed by inverted conical walls 213 and 223 and located below the upper guiding sleeve 2B;

a screw thread guiding section 2D located between the upper guiding sleeve 2B and the lower guiding sleeve 2C on a position of the first blade 21 and the second blade 22 corresponding to each other, and formed in a specification matching the traveling path and the pitch of screw threads 31 of the lag spike 3 having at least one thread guiding sleeve 214 and 224 to direct fastening and positioning of the lag spike 3; and a nail point section 2E located on a lower portion of the nail body 20 consisting of a first point section 215 and a second point section 225 of the first blade 21 and the second blade 22 that are coupled together. The first point section 215 has a size and length slightly greater than that of the second point section 225. The first point section 215 further has an indented recess 2151 to hold the second point section 225 closely.

In addition, the first and second point sections 215 and 225 have respectively at least one longitudinal reinforced rib 216 and 226 corresponding to each other. The first point section 215 has two lateral sides formed respectively a saw-toothed edge 2152.

The first blade 21 and the second blade 22 further have a transverse rib action zone 2F formed by at least one transverse and bent rib 217 and 227 between the nail point section 2E and the lower guiding sleeve 2C that correspond to each other. The interval of the transverse ribs 217 and 227 corresponds to the pitch of the lag spike 3 so that the nail point section 2E may be guided and expanded at a greater amount when the lag spike 3 runs through.

Moreover, the first blade 21 has at least one coupling flap 218 on the outer edge to latch on a notch 228 formed on a corresponding outer edge of the second blade 22 when folded so that the first blade 21 and the second blade 22 are coupled firmly without separating.

The first blade 21 and the second blade 22 also have respectively at least one longitudinal reinforced rib 219 and 229 close to lateral sides to increase the strength of the nail body 20.

Figure 7:
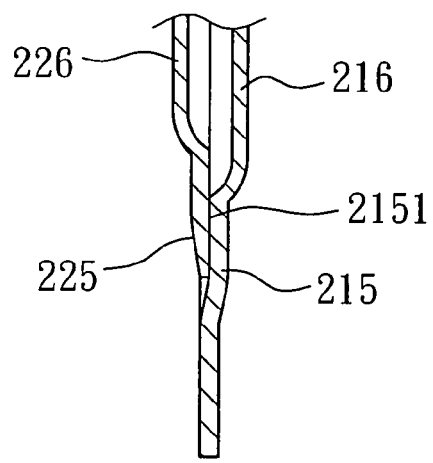
FIG. 7 is a fragmentary sectional view of the nail point section of the invention.
Figures 8, 9:
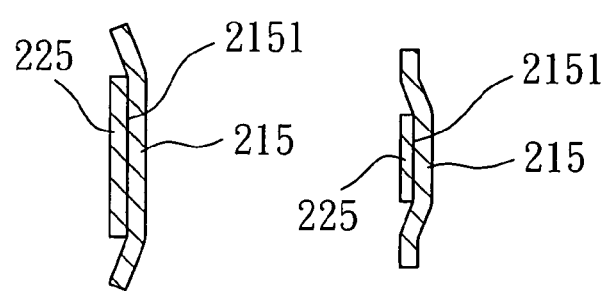
FIG. 8 is a cross section taken on line I—I in FIG. 6.
FIG. 9 is a cross section taken on line II—II in FIG. 6.
Figure 10:
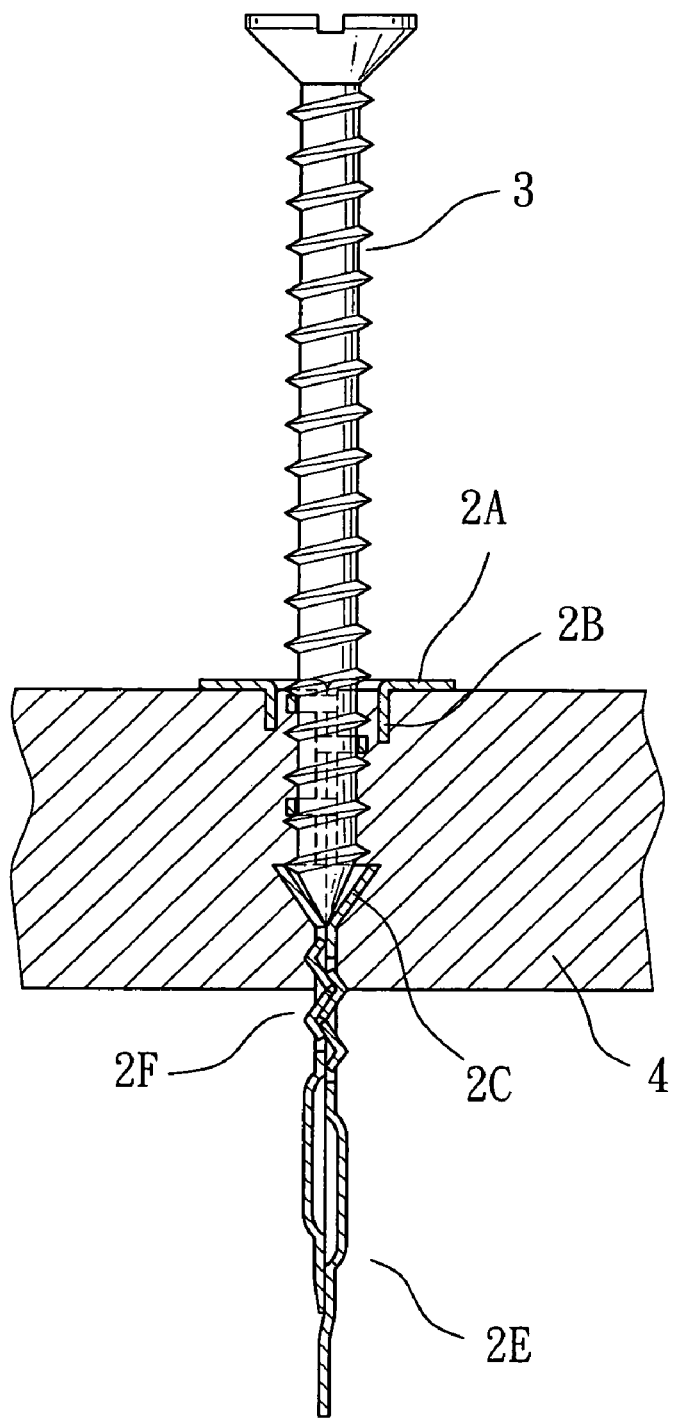
FIG. 10 is a schematic view of the invention nailed into a wall.
Figure 11:
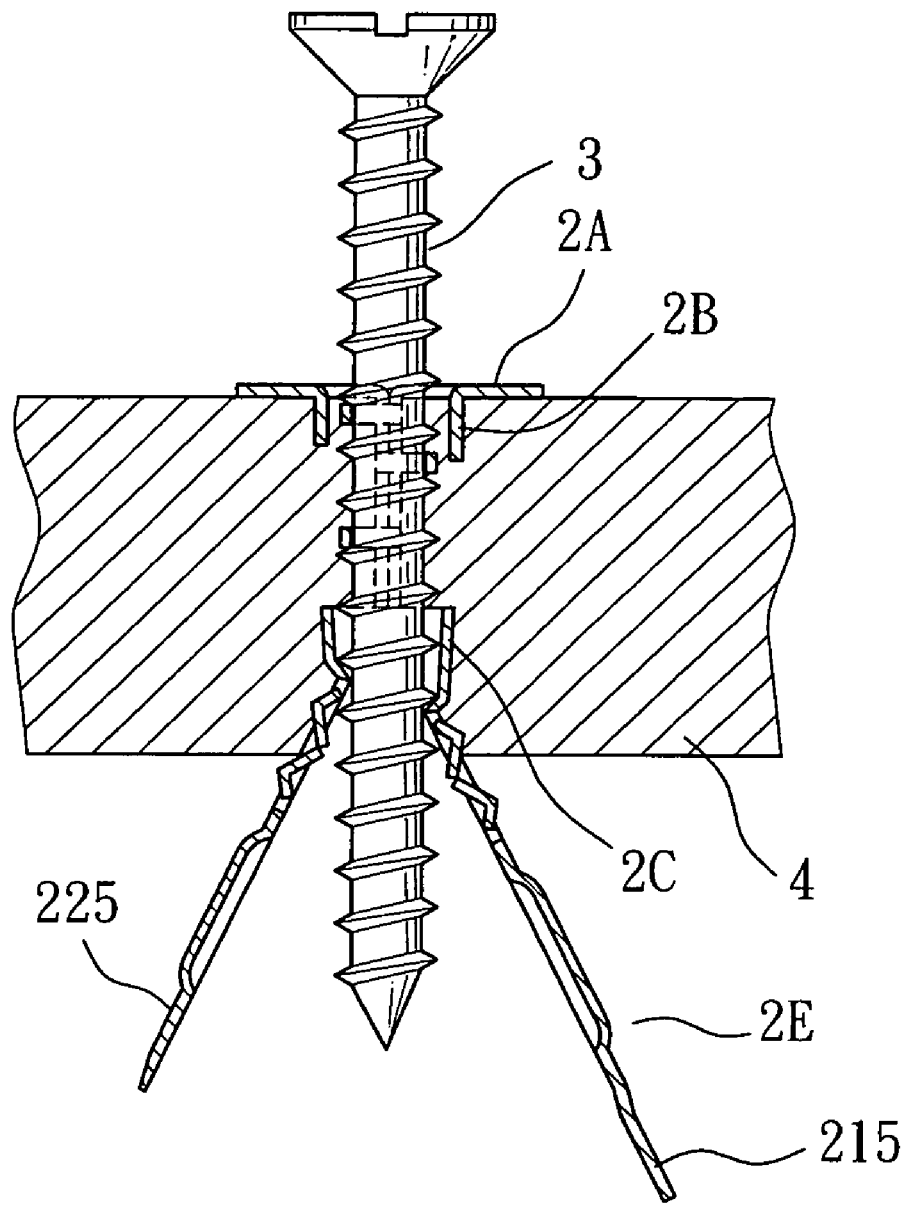
FIG. 11 is another schematic view of the invention nailed into a wall.

By means of the structure set forth above, when in use in construction (referring to FIGS. 6 through 11), first, point the nail point section 2E of the nail body 20 to a desired location on the gypsum board or fiber board wall 4; hit the striking section 2A by a tool; as the second point section 225 of the second blade 22 is closely held in the indented recess 2151 of the first blade 21 so that the cross section of the first point section 215 becomes the entire coupled cross section of the first and the second point sections (referring to FIGS. 7, 8 and 9), hence the piercing resistance can be reduced drastically. Moreover, the longitudinal reinforced ribs 216, 219, 226 and 229 of the point sections 215 and 225 can increase the strength of the nail body 20, thus deformation of the nail body may be avoided when subject to striking and defective construction may be prevented. After the nail point section 2E is sunk into the gypsum board or fiber board wall 4, the lag spike 3 may be fastened into the lag spike guiding hole A, and directed by the upper guiding sleeve 2B and the screw thread guiding section 2D into the lower guiding sleeve 2C. As the upper guiding sleeve 2B and the lower guiding sleeve 2C are located on the same center line, and the thread guarding sleeves 214 and 224 mate and are confined by the screw threads 31 of the lag spike 3, skewing of the spike nail may be prevented. When the nail point 311 of the spike nail 3 is sunk into the lower guiding sleeve 2C by screwing, the transverse rib action zone 2F below the inverted conical walls 213 and 223 will be rammed by a greater piercing thrust to form a new thrust spot to increase outward expansion degree of the nail point section 2E (referring to FIGS. 10 and 11). Therefore, the nail point section 2E can be fully extended to fasten the nail body 20 firmly in the wall 4. And the lag spike 3 can firmly hang articles desired.

I claim:

1. A spike nail structure comprising a first blade and a second blade that are coupled together to form a nail body, the nail body including:
    a striking section located on a upper side of the nail body and formed by bending head sections outwards that are located respectively on a upper portion of the first blade and the second blade having a lag spike guiding hole in the center;
    a upper guiding sleeve formed by extending hole walls of the lag spike guiding hole downwards to direct insertion of a lag spike;
    a lower guiding sleeve formed by inverted conical walls and located below the upper guiding sleeve;
    a screw guiding section located between the upper guiding sleeve and the lower guiding sleeve on a position of the first blade and the second blade corresponding to each other and formed in a specification matching the traveling path and the pitch of screw threads of the lag spike having at least one thread guiding sleeve to direct fastening and positioning of the lag spike; and
    a nail point section located on a lower portion of the nail body consisting of a first point section of the first blade and a second point section of the second blade that are coupled together, the first point section having a size and length greater than that of the second point section, the first point section further having an indented recess to hold the second point section closely,
    wherein the first point section has at least one first longitudinal reinforced rib and the second point section has at least one second longitudinal reinforced rib corresponding with and offset from the at least one first longitudinal reinforced rib, the at least one first longitudinal reinforced rib and the at least one second longitudinal reinforced rib protrude outwardly in opposing directions.

2. The spike nail structure of claim 1, wherein the upper guiding sleeve and the lower guiding sleeve are located on a same center line.

3. The spike nail structure of claim 1, wherein the first point section has two sides formed respectively a saw-toothed edge.

4. The spike nail structure of claim 1, wherein the first blade and the second blade further have a transverse rib action zone formed by at least one transverse and bent rib between the nail point section and the lower guiding sleeve.

\* \* \* \* \*